US009525314B2

United States Patent
Sato et al.

(10) Patent No.: US 9,525,314 B2
(45) Date of Patent: Dec. 20, 2016

(54) ROTARY ELECTRIC MACHINE

(71) Applicant: Mitsubishi Electric Corporation, Chiyoda-ku, Tokyo (JP)

(72) Inventors: Soichi Sato, Chiyoda-ku (JP);
Yoshihiko Onishi, Chiyoda-ku (JP);
Katsunari Takagi, Chiyoda-ku (JP);
Keisuke Shimomura, Chiyoda-ku (JP);
Manabu Yoshinori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 750 days.

(21) Appl. No.: 13/886,995

(22) Filed: May 3, 2013

(65) Prior Publication Data

US 2014/0197705 A1    Jul. 17, 2014

(30) Foreign Application Priority Data

Jan. 17, 2013   (JP) .................................. 2013-005931

(51) Int. Cl.
*H02K 5/04* (2006.01)
*H02K 7/08* (2006.01)
(Continued)

(52) U.S. Cl.
CPC ................ *H02K 1/185* (2013.01); *H02K 5/04* (2013.01)

(58) Field of Classification Search
CPC .............. H02K 5/04; H02K 5/06; H02K 5/08; H02K 5/15; H02K 5/16; H02K 5/161; H02K 5/163; H02K 5/165; H02K 5/167; H02K 5/1672; H02K 5/1675; H02K 5/1677; H02K 5/173; H02K 5/1732; H02K 5/1735; H02K 5/1737; H02K 7/08; H02K 7/081; H02K 7/083; H02K 7/085; H02K 7/086; H02K 7/088
(Continued)

(56) References Cited

U.S. PATENT DOCUMENTS 3,546,503 A *  12/1970  Richardson .............. H02K 3/47
                                                    310/179
3,727,459 A *   4/1973  Buettner ................. G01F 1/203
                                                     73/227

(Continued)

FOREIGN PATENT DOCUMENTS

CN       102687372 A       9/2012
JP        64-9435 U        1/1989
(Continued)

OTHER PUBLICATIONS

Inayama et al. (JP 2009060760 A) English Translation.*
(Continued)

*Primary Examiner* — Quyen Leung
*Assistant Examiner* — Robert E Mates
(74) *Attorney, Agent, or Firm* — Sughrue Mion, PLLC

(57) ABSTRACT

In the rotary electric machine, a cylinder 04a of a ring component 04 is formed in such a way that a fitting outer surface 04c1 of the cylinder 04a of the ring component 04 is fitted to a fitting inner surface 02a of a first housing 02; a clearance value between the fitting outer surface of the cylinder and a fitting inner surface of the first housing is lower than a clearance value between an outer surface, in which the fitting outer surface is excepted, of the cylinder and an inner surface, in which the fitting inner surface is excepted, of the first housing; and a position in a diameter direction of a stator core 3 facing to the first housing is set by above-described fitting process.

12 Claims, 8 Drawing Sheets

(51) Int. Cl.
*H02K 5/06* (2006.01)
*H02K 5/15* (2006.01)
*H02K 1/18* (2006.01)

(58) Field of Classification Search
USPC .............................. 310/89, 91, 418, 425, 428
See application file for complete search history.

(56) References Cited

U.S. PATENT DOCUMENTS

| 5,315,200 | A | * | 5/1994 | Lemieux | ................ | H02K 1/185 |
| | | | | | | 29/596 |
| 2011/0273040 | A1 | * | 11/2011 | Chamberlin | ............. | H02K 1/32 |
| | | | | | | 310/59 |
| 2012/0007456 | A1 | | 1/2012 | Hein et al. | | |
| 2012/0242186 | A1 | | 9/2012 | Hattori | | |
| 2012/0306312 | A1 | | 12/2012 | Endo et al. | | |

FOREIGN PATENT DOCUMENTS

| JP | 11-215745 A | | 8/1999 |
| JP | 11215745 A | * | 8/1999 |
| JP | 4115961 B2 | | 4/2008 |
| JP | 2009-060760 A | | 3/2009 |
| JP | 2009060760 A | * | 3/2009 |
| JP | 2009142031 A | * | 6/2009 |
| JP | 2009-213209 A | | 9/2009 |
| JP | 2010-057260 A | | 3/2010 |
| JP | 2012-514964 A | | 6/2012 |
| WO | 2011/080817 A1 | | 7/2011 |
| WO | 2011/101960 A1 | | 8/2011 |

OTHER PUBLICATIONS

Kurosawa (JP 11215745 A) English Translation.*
Fu (JP 2009142031) English Translation.*
Japanese Office Action, (Reasons), dated Jan. 28, 2014, Application No. 2013-005931.
Communication dated Nov. 23, 2015, from the State Intellectual Property Office of the People's Republic of China in counterpart Application No. 201310234460.6.
Communication, Jul. 4, 2016, from the State Intellectual Property Office of the P.R.C.,in counterpart Chinese application No. 201310234460.6.

* cited by examiner

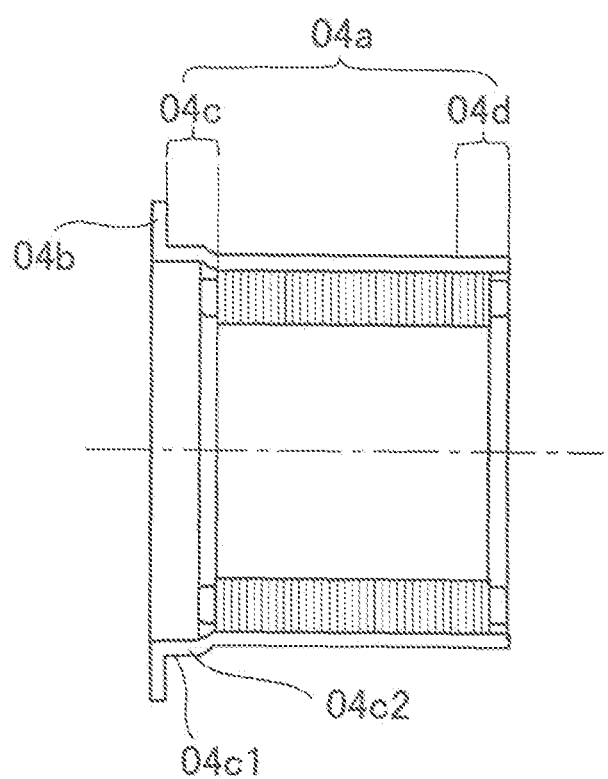

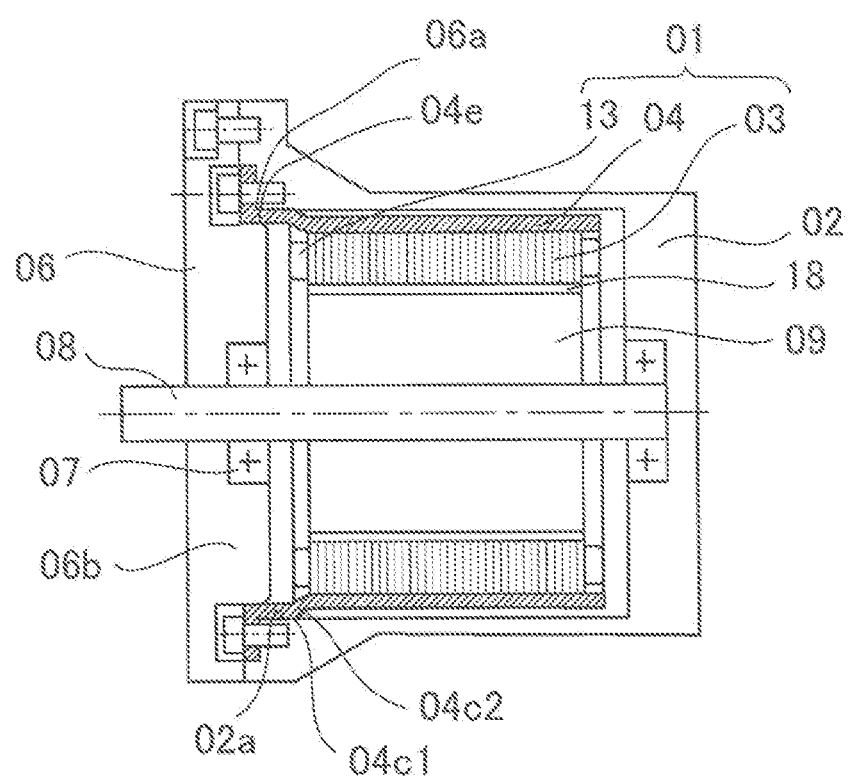

ROTARY ELECTRIC MACHINE

BACKGROUND OF THE INVENTION

Technical Field

The present invention relates to a rotary electric machine, and particularly relates to a holding mechanism of a stator thereof.

Background Art

In rotary electric machines mounted on vehicles, such as cars, in a type of a rotary electric machine, such as a motor for a hybrid vehicle or a generator for a hybrid vehicle, in which a length of a stator core is relatively short, a stator includes a stator core and a ring component that is mounted on an outer surface of the stator core. Moreover, the ring component includes a cylinder that is mounted on the outer surface of the stator core by burn-fitting or press-fitting so as to connect the stator core, and a flange for fixing the ring component to a housing of the rotary electric machine.

A conventional rotary electric machine described in Patent Document 1 is configured in such a way that a flange provided on one end portion in an axis direction of a ring component is fixed to an open portion of a housing, and the other end portion in the axis direction of the ring component is fitted to a bottom portion of the housing. An inside diameter of the bottom portion of the housing, by which the other end portion in the axis direction of the ring component is fitted, is shorter than an inside diameter of the open portion of the ring component.

A conventional rotary electric machine described in Patent Document 2 includes a flange on one end portion in an axis direction of a ring component, and a skirt area on the other end portion in the axis direction of the ring component. An outside diameter of the skirt area of the ring component is longer than an outside diameter of an area to which a stator core of the ring component is connected. The flange of the ring component is fixed to an open portion of a housing, and the skirt area of the ring component is contacted to an inner surface of the bottom portion of the housing so as to be disposed.

A conventional rotary electric machine described in Patent Document 3 is configured in such a way that a flange of a ring component is fixed to a housing by a plurality of bolts screwed in an axis direction of the housing, and the housing and the ring component are positioned by a knock pipe or a knock pin.

As described in Patent Document 4, in a type of a rotary electric machine, for example, a motor for an electric vehicle, in which a length in an axis direction of a stator core is relatively long, the rotary electric machine is configured in such a way that the stator core is fixed to a housing by burn-fitting or press-fitting.

CONVENTIONAL ART DOCUMENT

Patent Document

[Patent Document 1]
International Publication No. WO/2011/080817A1
[Patent Document 2]
International Publication No. WO/2011/101960A1
[Patent Document 3]
Japanese Patent Publication No. 4115961
[Patent Document 4]
Japanese Laid-Open Patent Publication No. 2009-213209

SUMMARY OF THE INVENTION

Problems to be Solved by the Invention

In a conventional rotary electric machine described in Patent Document 1, it is designed that a clearance value between an outer surface of the other end portion in an axis direction of a cylinder and an inner surface in a housing is lower than a clearance value between an outer surface of one end portion in the axis direction of the cylinder including a flange and the inner surface in the housing. Moreover, the rotary electric machine is configured in such a way that the other end portion in the axis direction of the cylinder, for which the clearance value is lower, is a portion for setting a position in a radial direction of the cylinder facing to the housing, in other words, a position in a radial direction of a stator core.

However, stiffness of the other end portion in the axis direction of the cylinder of the ring component is lower than stiffness of the one end portion including the flange in the axis direction, so that a deformation of the ring component is easily caused when the stator core is press-fitted or burn-fitted to the ring component. Moreover, when the ring component is manufactured, manufacture accuracy is easily decreased, so that a positioning deviation in a diameter direction of the ring component and the housing is easily caused. When the deviation in the diameter direction of the ring component and the housing is caused, an axis of the stator core facing to the housing is deviated, so that there have been problems in that a reduction of a motor characteristic, for example, noise generation or a reduction of a torque characteristic is easily caused.

Moreover, in a conventional rotary electric machine described in Patent Document 2, stiffness is increased by providing the skirt area on the other end portion in the axis direction of the ring component, and a deformation of the conventional rotary electric machine can be suppressed when the stator core is press-fitted or burn-fitted to the ring component. However, there have been problems in that manufacture accuracy of the other end portion in the axis direction is lower than manufacture accuracy of the one end portion including the flange in the axis direction, so that a positioning deviation in the axis direction of the ring component and the housing is easily caused, and an axis of the stator facing the housing is deviated, and moreover, a reduction of a motor characteristic, for example, noise generation or a reduction of a torque characteristic is easily caused.

Moreover, in a conventional rotary electric machine described in Patent Document 3, an axis of holes for inserting the knock pipe and the knock pin in the housing is different from an axis of a portion for housing the ring component, so that position accuracy at the time of manufacturing rotary electric machine is low. Therefore, the axis of the stator core facing to the housing is deviated, so that there have been problems in that a reduction of a motor characteristic, for example, noise generation or a reduction of a torque characteristic is easily caused.

Moreover, in a conventional rotary electric machine described in Patent Document 4, a ring component is not used, and the stator core is directly press-fitted or burn-fitted to a frame, so that a deformation of the ring component or positioning deviations, according to manufacturing accuracy, in the axis direction of the stator and the housing is not caused. However, the ring component is a component configured by a thin plate, and the housing includes a cooling passage and a female screw and the like, which are used to connecting the front housing, and a volume and a weight are substantially increased, so that there have been problems in that a facility for press-fitting or burn-fitting the housing becomes large.

The present invention has been made to solve the above-described problems of conventional rotary electric machines, and an object of the invention is to provide a rotary electric machine in which positions in a diameter direction of a stator core and a housing can be set with a high accuracy, and a motor characteristic of the rotary electric machine can be prevented from deteriorating.

Means for Solving Problems

A rotary electric machine includes a stator core that is formed in an annular shape; a rotor that is supported in a freely rotational state, and is inserted to inner space of the stator core; a first housing that houses the stator core and the rotor; a second housing that is provided so as to face toward one end portion in an axis direction of the first housing; and a ring component that is mounted on an outer surface of the stator core; wherein the ring component includes a cylinder surrounding the outer surface of the stator core, and a flange provided on one end portion in an axis direction of the cylinder; the cylinder of the ring component is formed in such a way that a fitting outer surface, which is provided at a side corresponding to the one end portion of the axis direction, is fitted to a fitting inner surface, which is provided at a side corresponding to one end portion of the axis direction of the first housing; a clearance value between the fitting outer surface of the cylinder and the fitting inner surface of the first housing is lower than a clearance value between an outer surface, in which the fitting outer surface is excepted, of the cylinder and an inner surface, in which the fitting inner surface is excepted, of the first housing; and a position in a diameter direction of the stator core facing to the first housing is set by fitting the fitting outer surface of the cylinder to the fitting inner surface of the first housing.

In the present invention, the description for "the cylinder of the ring component is formed in such a way that a fitting outer surface, which is provided at a side corresponding to the one end portion of the axis direction, is fitted to a fitting inner surface, which is provided at a side corresponding to one end portion of the axis direction of the first housing" includes a description in a case where the fitting outer surface of the cylinder is fitted to the fitting inner surface of the first housing in a state where the clearance value is 0, and a description in a case where the fitting outer surface of the cylinder is fitted to the fitting inner surface of the first housing in a state where the clearance value is higher than 0.

Effects of the Invention

According to the rotary electric machine of the present invention, the ring component includes a cylinder surrounding the outer surface of the stator core, and a flange provided on one end portion in an axis direction of the cylinder; the cylinder of the ring component is formed in such a way that a fitting outer surface, which is provided at a side corresponding to the one end portion of the axis direction, is fitted to a fitting inner surface, which is provided at a side corresponding to one end portion of the axis direction of the first housing; a clearance value between the fitting outer surface of the cylinder and the fitting inner surface of the first housing is lower than a clearance value between an outer surface, in which the fitting outer surface is excepted, of the cylinder and an inner surface, in which the fitting inner surface is excepted, of the first housing; and a position in a diameter direction of the stator core facing to the first housing is set by fitting the fitting outer surface of the cylinder to the fitting inner surface of the first housing, whereby the fitting outer surface of the ring component has high stiffness because the fitting outer surface is formed at a position neighboring the flange. Therefore, the rotary electric machine can be supplied in which the fitting outer surface has high manufacturing accuracy, and a deformation of the first housing is decreased at the time of press-fitting, and moreover, the stator core and the housing can be positioned in a diameter direction with high accuracy, whereby a motor characteristic of the rotary electric machine can be prevented from deteriorating.

BRIEF DESCRIPTION OF THE DRAWINGS

FIG. 4 is a cross-sectional view illustrating a stator of the rotary electric machine according to Embodiment 2 of the present invention;

FIG. 6 is a cross-sectional view illustrating a rotary electric machine according to Embodiment 4 of the present invention;

DETAILED DESCRIPTION OF THE PREFERRED EMBODIMENTS

Hereinafter, a rotary electric machine according to the present invention will be explained. In addition, reference symbols, which are the same as those in each of embodiments described later, refer to the same or equivalent parts so as to be explained.

Embodiment 1

Figures 1A, 1B:
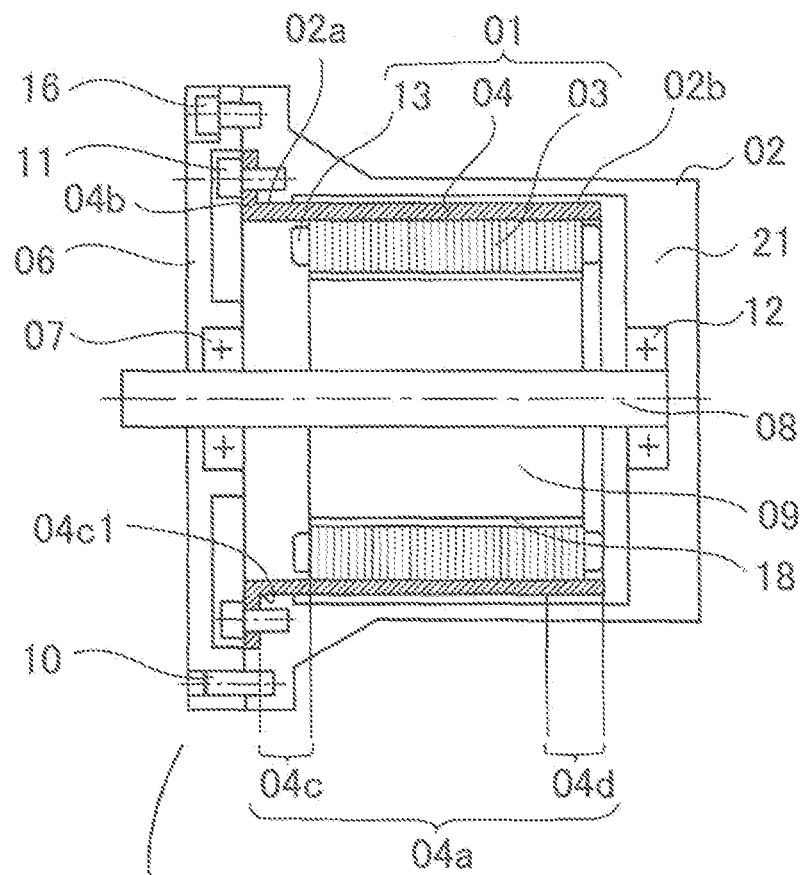
FIGS. 1A and 1B are cross-sectional views illustrating a rotary electric machine according to Embodiment 1 of the present invention.
Figure 2:
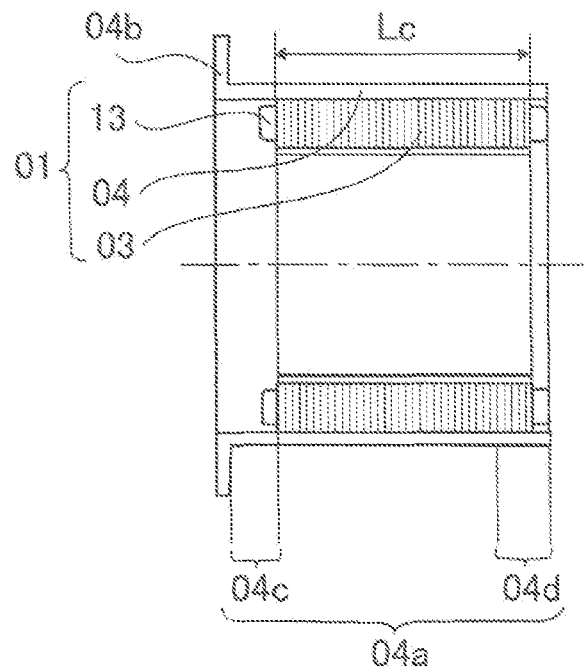
FIG. 2 is a cross-sectional view illustrating a stator of the rotary electric machine according to Embodiment 1 of the present invention.

Although a rotary electric machine according to Embodiment 1 of the present invention, which is described later, indicates a type of rotary electric machines, such as motors for a hybrid vehicle or generators for a hybrid vehicle, in which lengths in an axis direction of stator cores are relatively short, the present invention can be applied to the other rotary electric machines. FIG. 1 are cross-sectional views illustrating the rotary electric machine according to Embodiment 1 of the present invention. FIG. 1A is a cross-sectional view illustrating the rotary electric machine, and FIG. 1B is an enlarged cross-sectional view illustrating a part of the rotary electric machine. FIG. 2 is a cross-sectional view illustrating a stator of the rotary electric machine according to Embodiment 1 of the present invention.

In FIG. 1 and FIG. 2, a stator 01 includes a stator core 03 formed in an annular shape, a stator coil 13 installed in a slot (not illustrated) of the stator core 03, and a ring component 04, of which length in an axis direction is "Lc", that is mounted on (attached to) an outer surface of the stator core 03. The stator core 03, in which a plurality of separated cores is arranged in an annular shape, is fastened by the ring component 04. The ring component 04 is mounted on (attached to) the outer surface of the stator core 03 by a burn-fit method, a press-fit method or the like. Each of the separated cores is formed by laminating many magnetic sheets.

The ring component 04 includes a cylinder 04a that is integrally fixed to the stator core 03, and a flange 04b that is formed at an end portion in an axis direction of the cylinder 04a. A fitting outer surface 04c1, which is fitted to a fitting inner surface 02a of a first housing 02 described later, is composed a part of an outer surface at a side corresponding to the end portion in the axis direction of the cylinder 04a.

In the first housing 02 formed in a cylindrical shape, one end portion in an axis direction is opened, and other end portion in an axis direction is closed by a bottom portion 21. As indicated in FIG. 1B, a thickness size t1 in a diameter direction at one end portion in an axis direction of the first housing 02 is defined in such a way that the thickness size t1 is larger than a thickness size t2 in the diameter direction at the other end portion in the axis direction. The fitting inner surface 02a is provided at a side corresponding to the end portion in the axis direction of the first housing 02. The fitting inner surface 02a is formed by an inner surface of an annular step 02a1 that is protruded from the other inner surface of the first housing 02 to an inside in the diameter direction.

The stator 01, which is configured by integrally fixing the stator core 03, the stator coil 13, and the ring component 04, is installed in inner space of the first housing 02. The fitting outer surface 04c1 of the ring component 04 of the stator 01 is fitted to the fitting inner surface 02a of the first housing 02. A position of the stator 01, facing to the first housing 02, in the diameter direction is set in such a manner that the fitting outer surface 04c1 of the cylinder 04a is fitted to the fitting inner surface 02a of the first housing 02. In other words, the stator 01 is positioned, in the diameter direction, toward the first housing 02 in such a manner that an axis of the stator 01 corresponds to an axis of the first housing 02 by fitting the fitting outer surface 04c1 to the fitting inner surface 02a.

The fitting process of the fitting outer surface 04c1 of the ring component 04 and the fitting inner surface 02a of the first housing 02 may be performed by a fitting process of press-fitting or burn-fitting, in other words, a fitting process, in a case where a clearance value is "0", or a fitting process, in a case where a clearance value is higher than equal to "0". In any of these cases, the clearance values are set to be lower than a clearance value of an outer surface, except for the fitting outer surface 04c1 of the ring component 04, and a clearance value of an inner surface, except for the fitting inner surface 02a of the first housing 02. In other words, a clearance value between an outer surface at the other end portion 04d in the axis direction of the ring component 04 and an inner surface neighboring the other end portion in the axis direction of the first housing 02 is set to be higher than a clearance value between the fitting outer surface 04c1 of the ring component 04 and the fitting inner surface 02a of the first housing 02.

The flange 04b of the ring component 04 is fitted into a concave portion that is formed at a circumference of an opening area of one end portion in the axis direction of the first housing 02. In addition, it is not always required that the concave portion is formed. The flange 04b is fixed, by a plurality of bolts 11, to the one end portion in the axis direction of the first housing 02. In addition, the bolts 11 can be replaced by the other components such as rivets or the like.

A second housing 06 used as a front housing is disposed at the one end portion in the axis direction of the first housing 02, and is fixed to the first housing 02 by a plurality of bolts 16 (only one bolt is illustrated in FIG. 1). When the first housing 02 and the second housing 06 are connected by the bolts 16, a position of the second housing 06, in a circumference direction, facing to the first housing 02 is set by inserting each of two positioning pins 10 (only one pin is illustrated in FIG. 1) to each of positioning holes 02c, which are formed at two positions (only one position is illustrated in FIG. 1) of the one end portion in the axis direction of the first housing 02, and to positioning-through holes 06a1, which is formed at two positions (only one position is illustrated in FIG. 1) of the second housing 06. Moreover, as described above, the first housing 02 is fixed to the second housing 06 by the bolts 16 in such a manner that an axis line of a shaft 08 corresponds to an axis line of the first housing 02.

A front bearing 07 is fixed at a center of the second housing 06, and a rear bearing 12 is fixed at a center of the bottom portion 21 of the first housing 02. The shaft 08 is supported, in a freely rotational state, by the front bearing 07 and the rear bearing 12. A rotor 09 fixed to the shaft 08 is inserted to inner space of the stator core 03. The rotor 09 includes a rotor core, which is configured by laminating many magnetic sheets having circular shape, and a magnet that is buried in the rotor core.

Firstly, as a first process of assembly of the rotary electric machine, which is configured as described above, according to Embodiment 1 of the present invention, the stator 01, which is configured by integrally combining the stator core 03, the stator coil 13, and the ring component 04, is installed to inner space of the first housing 02. Next, as described above, the flange 04b of the ring component 04 is fixed, by the bolts 11, to the one end portion in the axis direction of the first housing 02.

Secondly, as a second process, the front bearing 07 and the front housing 06 are mounted near the one end portion in the axis direction of the shaft 08 fixing the rotor 09, and the rear bearing 12 is mounted on the other end portion in the axis direction of the shaft 08. In addition, a temporal sequence for the first process and the second process is not a problem.

As a third process, the rotor 09, the shaft 08, the front bearing 07, the front housing 06, and the rear bearing 12, which are integrally assembled in the second process, are incorporated into the first housing 02 and the stator 01, which are integrally assembled in the first process, and these components are integrally fixed by the bolts 16. In the third process, the rotor 09 and the rear bearing 12 as well as the shaft 08 are inserted from a left side in the axis direction in FIG. 1 to the inner space of the stator core 03. Finally, the third process is completed in such a way that the rear bearing 12 is fitted to bearing holder that is formed at a center of the bottom portion 21 of the first housing 02.

According to the rotary electric machine according to Embodiment 1 of the present invention, in the cylinder 04a of the ring component 04, stiffness of the one end portion 04c in the axis direction, on which the flange 04b is formed, is higher than stiffness of the other end portion 04d in the axis direction, so that a deformation of the ring component 04 is decreased when the stator core 03 is press-fitted or burn-fitted to the inside of the cylinder 04a, and moreover, manufacture accuracy is increased when the ring component 04 is manufactured.

Moreover, after the stator core 03 is press-fitted or burn-fitted to the inside of the cylinder 04a of the ring component 04, an inside diameter of the cylinder 04a at the flange 04b side or the one end portion 04c side in the axis direction is not touched to the outer surface of the stator core 03, and a deformation caused by press-fitting or burn-fitting is decreased. Therefore, the stator 01 and the first housing 02 can be positioned in an axis direction with high accuracy in such a way that the fitting outer surface 04c1, which is formed on the outer surface of the one end portion 04c side in the axis direction of the cylinder 04a, is fitted to the fitting inner surface 02a of the first housing 02. In addition, this matter is not limited to a rotary electric machine in which a length in an axis direction of a stator core 03 is relatively short.

Moreover, in a conventional rotary electric machine, the components are composed in such a way that the first housing 02 is fitted to the ring component 04 at the bottom portion 21 side of the first housing 02, so that, when the stator 01 is configured, the stator 01 must be inserted to the bottom portion 21 of the first housing 02 in a state where an axis of the stator 01 is aligned with an axis of the first housing 02, and an assembling capability is decreased. However, in the rotary electric machine according to Embodiment 1 of the present invention, after the stator 01 is simply inserted to the first housing 02 at the time of assembling the first housing 02 and the stator 01, the axis of the stator 01 can be aligned with the axis of the first housing 02 only by fitting the fitting inner surface 02a of the first housing 02 to the fitting outer surface 04c1 of the ring component 04, and an assembling capability of the rotary electric machine can be increased.

Moreover, the ring component 04 can be fitted to the first housing 02 without using a knock pin, a knock pipe or the like, and positions of the stator 01 and the first housing 02 can be set in a diameter direction, so that positioning accuracy of the stator 01 and the first housing 02 in the diameter direction is not decreased in accordance with manufacture accuracy of a hole for the knock pin or the knock pipe. Furthermore, the knock pin and the knock pipe are not used in order to position the stator 01 and the first housing 02 in the diameter direction, so that a number of components can be reduced.

Moreover, in a conventional rotary electric machine, a stator core 03 and a first housing 02 are press-fitted or burn-fitted. However, in the rotary electric machine according to Embodiment 1 of the present invention, the stator core 03 is press-fitted or burn-fitted to the ring component 04, and those are fixed to the first housing 02, and moreover, volume and weight of the ring component 04 are substantially lower than those of the first housing 02. Therefore, a facility for press-fitting or burn-fitting can be simply formed. This effect is remarkable for a rotary electric machine in which a length of a stator core 03 in an axis direction is relatively long.

Furthermore, a thickness t1 in a radial direction of a portion corresponding to the fitting inner surface 02a of the first housing 2 is larger than at least a thickness in a radial direction of a portion neighboring the other end portion in the axis direction of the first housing 2, so that stiffness of the fitting inner surface 02a can be increased, and manufacture accuracy can be increased when the components are manufactured. Therefore, the stator 01 and the first housing 02 can be positioned in the axis direction with higher accuracy.

Embodiment 2

Figure 3:
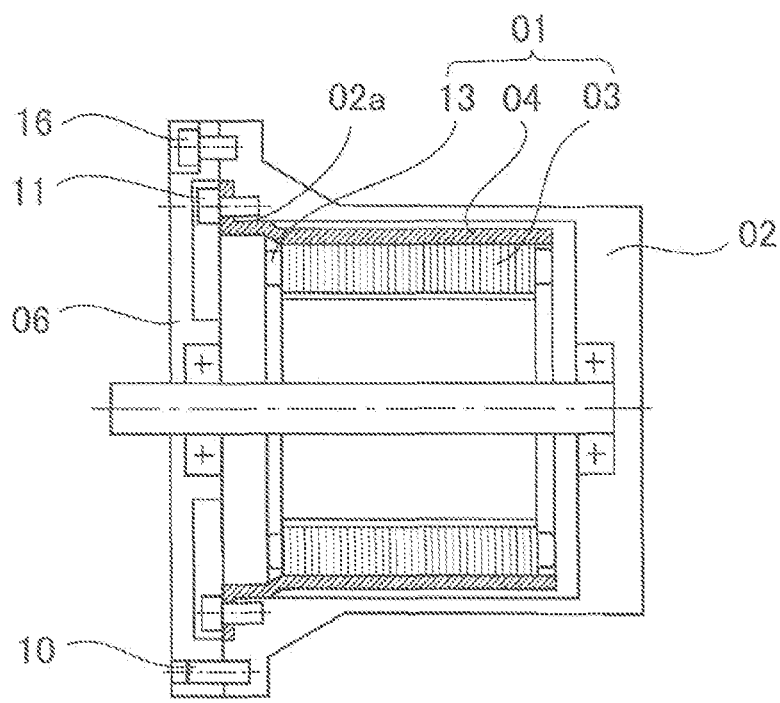
FIG. 3 is a cross-sectional view illustrating a rotary electric machine according to Embodiment 2 of the present invention.

Hereinafter, a rotary electric machine according to Embodiment 2 of the present invention will be explained. FIG. 3 is a cross-sectional view illustrating the rotary electric machine according to Embodiment 2 of the present invention, and FIG. 4 is a cross-sectional view illustrating a stator of the rotary electric machine according to Embodiment 2 of the present invention. In FIG. 3 and FIG. 4, a cylinder 04a of a ring component 04 includes an annular step 04c2 that is extended in a diameter direction at one end portion 04c in an axis direction. A flange 04b is formed at an end portion in an axis direction of the annular step 04c2. An outer surface of the annular step 04c2 is composed of a fitting outer surface 04c1 that is fitted to a fitting inner surface 02a of a first housing 02.

The first housing 02 is formed with a surface in such a way that whole inner surface is uniform in an axis direction. An inner surface near one end portion of the first housing 02 in an axis direction is composed of the fitting inner surface 02a that is fitted to the fitting outer surface 04c1 formed as an outer surface of the annular step 04c2 of the cylinder 04a. The other components are similar to components in the rotary electric machine according to Embodiment 1.

Figure 7A:
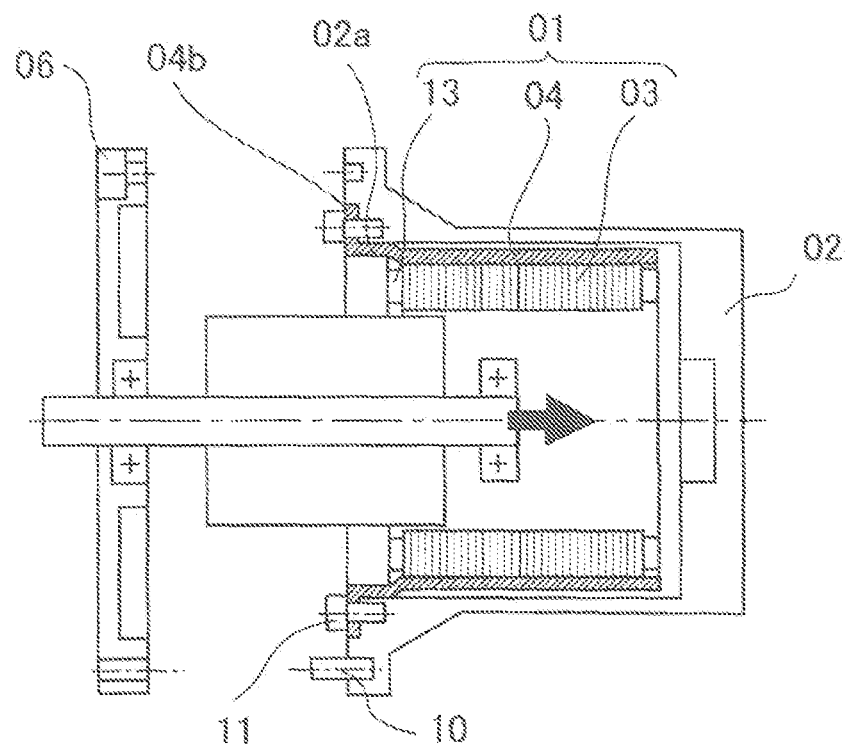
FIGS. 7A and 7B are explanatory views illustrating a mechanism and an assembly process of the rotary electric machine according to Embodiment 2 of the present invention.
Figure 7B:
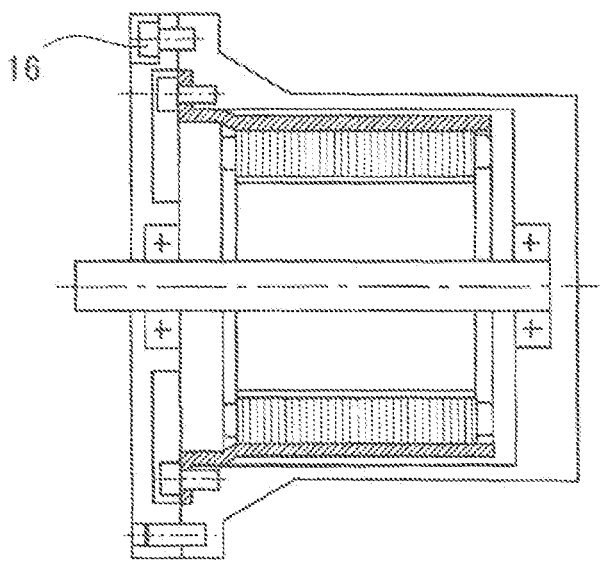

FIG. 7 are explanatory views illustrating a mechanism and an assembly process of the rotary electric machine according to Embodiment 2 of the present invention, and FIG. 7A illustrates an assembling state of the rotary electric machine, and then, FIG. 7B illustrates the rotary electric machine after it is assembled. As illustrated in FIG. 7, two positioning pins 10 (only one pin is illustrated in FIG. 7) are inserted two holes in circumference directions of the first housing 02 and a second housing 06, and positions in the circumference directions of the first housing 02 and the second housing 06 are fitted. Moreover, in order to prevent a shaft 08 from inclining, an axis of the shaft 08 is conformed to an axis of the first housing 02, and a stator 01 is inserted to inner space of the first housing 02, and then, the first housing 02 and the second housing 06 are joined and fixed by bolts 16.

In the rotary electric machine, which is configured as described above, according to Embodiment 2 of the present invention, the annular step 04c2 is formed at the flange 04b side of the cylinder 04a of the ring component 04, so that stiffness of the flange 04b side of the cylinder 04a is more increased, and a deformation of the ring component 04 is decreased when the stator core 03 is press-fitted or burn-fitted to the ring component 04, and moreover, manufacture accuracy is increased when the ring component 04 is manufactured. Therefore, the stator 01 and the first housing 02 can be positioned in an axis direction with high accuracy in such a way that the fitting outer surface 04c1 of the ring component 04 is fitted to the fitting inner surface 02a of the first housing 02.

Moreover, the annular step 04c2 is formed on the cylinder 04a of the ring component 04, and an outer surface of the annular step 04c2 is used as a fitting outer surface, so that it is not required that the annular step 02a1 described in Embodiment 1 is formed at the inner surface of the first housing 02, and the inner surface of the first housing 02 can be easily manufactured.

Furthermore, in a case of a rotary electric machine (refer to FIG. 8), which is described later, according to Embodiment 5, two kinds of holes for bolts 14 and bolts 16 must be formed in the first housing 02, whereas in a case of the rotary electric machine according to Embodiment 2, holes for bolts 14 must be formed in a second housing 06, and stiffness of the front housing 06 is increased. In a case of a rotary electric machine used for cars, a vibration applied to the rotary electric machine is stronger than a vibration applied to an industrial rotary electric machine, and it is important that stiffness of an attachment portion is increased. Therefore, when stiffness of the second housing 06 mounted on a car body is increased, a vibration is not easily propagated to the rotary electric machine, so that a noise at a time of driving can be reduced, and the rotary electric machine can be prevented from resonating.

Embodiment 3

Figure 5A:
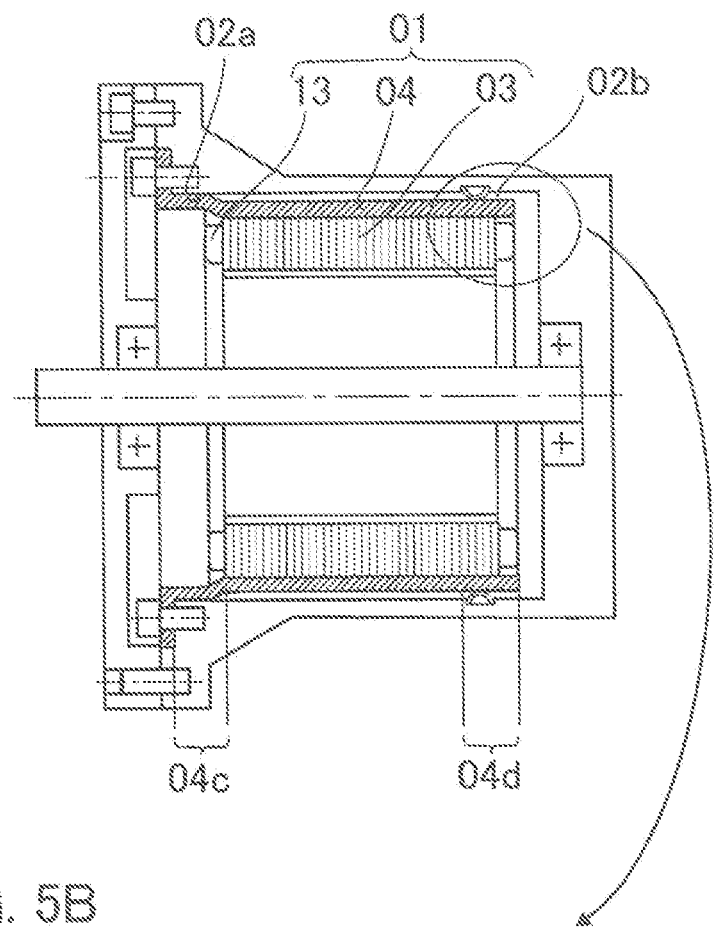
FIGS. 5A and 5B are cross-sectional views illustrating a rotary electric machine according to Embodiment 3 of the present invention.
Figure 5B:
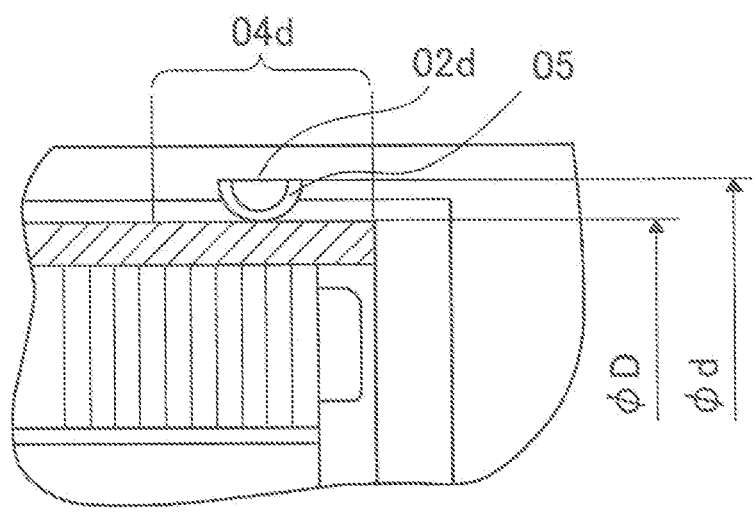

Hereinafter, a rotary electric machine according to Embodiment 3 of the present invention will be explained. FIG. 5 are cross-sectional views illustrating the rotary electric machine according to Embodiment 3 of the present invention. FIG. 5A is a cross-sectional view illustrating the whole rotary electric machine, and FIG. 5B is an enlarged cross-sectional view illustrating a part of the rotary electric machine. In FIG. 5, an elastic component 05 is provided at a portion, in other word at a clearance 02b, between an inner surface of a first housing 02 and an outer surface of the other end portion 04d in an axis direction of a ring component 04. The elastic component 05 is provided in a groove 02d that is formed on the inner surface of a first housing 02. In addition, it is not always required that the groove 02d is formed on the inner surface of a first housing 02. The other components are similar to components in the rotary electric machine according to Embodiment 2.

In the rotary electric machine, which is configured as described above, according to Embodiment 3 of the present invention, the elastic component 05 is provided at the portion, in other word at the clearance 02b, between the inner surface of a first housing 02 and the outer surface of the other end portion 04d in the axis direction of the ring component 04, so that the other end portion 04d in an axis direction of a cylinder 04a of the ring component 04 can be supported by the elastic component 05, whereby a vibration of a stator 01 can be reduced, and a noise at a time of driving can be reduced.

When the other end portion 04d in the axis direction of the cylinder 04a is not supported, especially in a rotary electric machine in which a length in an axis direction of a stator core 03 is relatively long, a natural frequency of the rotary electric machine is lower than a natural frequency of a rotary electric machine, in which a length in an axis direction of a stator core is short, and a spring constant is low, and moreover, a vibration at a time of driving the rotary electric machine is easily propagated. However, in the rotary electric machine according to Embodiment 3 of the present invention, the other end portion in the axis direction of the cylinder 04a is supported by the elastic component 05, so that the stator 01 can be prevented from vibrating, and a noise at a time of starting can be inhibited.

Moreover, in the rotary electric machine according to Embodiment 3, the stator 01 is supported by one end portion 04c and the other end portion 04d in an axis direction of the cylinder 04a. Therefore, when lengths in an axis direction of a fitting outer surface 04c1 of the cylinder 04a and a fitting inner surface 02a of the first housing 02 are shortened, the stator 01 can be supported with high accuracy in a diameter direction.

Moreover, because the length in the axis direction of the fitting portion can be shortened as described above, when the fitting outer surface 04c1 of the cylinder 04a is press-fitted to the fitting inner surface 02a of the first housing 02 so as to be fitted, the press-fit pressure can be decreased. Furthermore, because the lengths in the axis direction of the fitting portion can be shortened as described above, it is not required that the fitting portion is burn-fitted when the length in the axis direction of the fitting portion is long, and an effect, in which the components can be assembled by press-fitting at normal temperature, is obtained.

Moreover, the elastic component 05 can be prevented from moving in the axis direction by disposing the elastic component 05 in the groove 02d formed in the inner surface of the first housing 02. Thereby, the elastic component 05 can be prevented from moving in the axis direction at the time of assembling the stator 01, and the elastic component 05 can be prevented from moving in the axis direction in accordance with a vibration caused when the rotary electric machine is driven. Furthermore, an inside diameter size $\phi d$ of the groove 02d of the first housing 02 and an outside diameter size $\phi D$ at the other end portion 04d side in the axis direction of the cylinder 04a of the ring component 04 are suitably set, whereby a compress value and elasticity of the elastic component 05 can be suitably set. As a result, in order to support the other end portion 04d in the axis direction of cylinder 04a, required reactive force caused by the elastic component 05 can be obtained.

Embodiment 4

Hereinafter, a rotary electric machine according to Embodiment 4 of the present invention will be explained. FIG. 6 is a cross-sectional view illustrating the rotary electric machine according to Embodiment 4 of the present invention. In FIG. 6, a second housing 06 used as a front housing includes a fitting protrusion 06b on a wall surface facing to a first housing 02. A cylinder 04a of a ring component 04 includes an annular step 04c2, in a similar way in Embodiment 2 and Embodiment 3, at a flange 04b, in other words, at one end portion 04c in an axis direction. In addition, it is not always required that the annular step 04c2 is formed.

A portion of an inner surface at one end portion 04c in an axis direction of the cylinder 04a of the ring component 04, in other words, a portion 04e of an inner surface of the annular step 04c2 is fitted to an outer surface 06a of the fitting protrusion 06b of the first housing 02. Moreover, in a similar way in Embodiment 2 and Embodiment 3, a fitting outer surface 04c1 of the cylinder 04a is fitted to a fitting inner surface 02a of the first housing 02. The other components are similar to components in the rotary electric machine according to Embodiment 2.

In the rotary electric machine according to Embodiment 4 of the present invention, the portion of the inner surface at one end portion 04c in the axis direction of the cylinder 04a of the ring component 04 is fitted to the outer surface 06a of the fitting protrusion 06b of the first housing 02, and the fitting outer surface 04c1 of the cylinder 04a is fitted to the fitting inner surface 02a of the first housing 02, whereby the rotary electric machine can be assembled in a state where an axis of a stator 01 corresponds to an axis of the first housing 02.

Usually in the rotary electric machine, in order to obtain a favorable torque characteristic and a noise characteristic, it is important that an air gap 18 between an outside diameter of a rotor 09 and an inside diameter of a stator core 03 is uniformly formed. A front bearing 07 is fitted to the second housing 06, and the shaft 08 is fitted to the front bearing 07, and then, the rotor 09 is rotated in the stator core 03 in a state where the shaft 08 is used as a shaft of the components, so that it is important that an axis deviation from an inside diameter of the second housing 06 used as a front housing to an inside diameter of the stator 01 is reduced.

In a case of the above-described rotary electric machine according to Embodiment 2, the stator core 03 is connected, via the ring component 04, to the first housing 02 by bolts 11, and the second housing 06 is connected to the first housing 02 by bolts 16. Moreover, in order to position the first housing 02 and the second housing 06, two positioning pins 10 are required. However, the positioning pins 10 are disposed at a position that is different from an axis position of the rotary electric machine, so that, when holes for the positioning pins are formed, position accuracy corresponding to the axis of the rotary electric machine is easily decreased, and the axis of the second housing 06 may be deviated from the axis of the inside diameter of the stator 01.

On the other hand, in the rotary electric machine according to Embodiment 4, which is configured as described above, the portion of the inner surface of the one end portion 04c in an axis direction of the cylinder 04a of the ring component 04 is fitted to the outer surface 06a of the fitting protrusion 06b of the second housing 06, so that the axis of the stator 01 can correspond to the axis of the second housing 06 with a high accuracy, whereby an axis deviation from the second housing 06 to the stator 01 can be reduced, and a favorable torque characteristic and noise characteristic can be obtained. Moreover, a position in a diameter direction of the stator 01 facing to the second housing 06 is set by fitting the portion of the inner surface at the one end portion 04c in the axis direction of the cylinder 04a to the outer surface 06a of the fitting protrusion 06b of the second housing 06, so that it is not required that two positioning pins 10 are provided as described in Embodiment 2, whereby the rotary electric machine can be downsized, and a number of components can be reduced.

Moreover, when the portion of the inner surface of the one end portion 04c in an axis direction of the cylinder 04a is press-fitted to the outer surface 06a of the fitting protrusion 06b of the second housing 06, and the fitting outer surface 04c1 of the cylinder 04a is press-fitted to the fitting inner surface 02a of the first housing 02, the second housing 06, the stator 01, and the first housing 02 can be positioned in the axis direction with higher accuracy. Thereby, the air gap 18 can be uniformly formed, and a favorable torque characteristic and noise characteristic can be obtained.

Embodiment 5

Figure 8A:
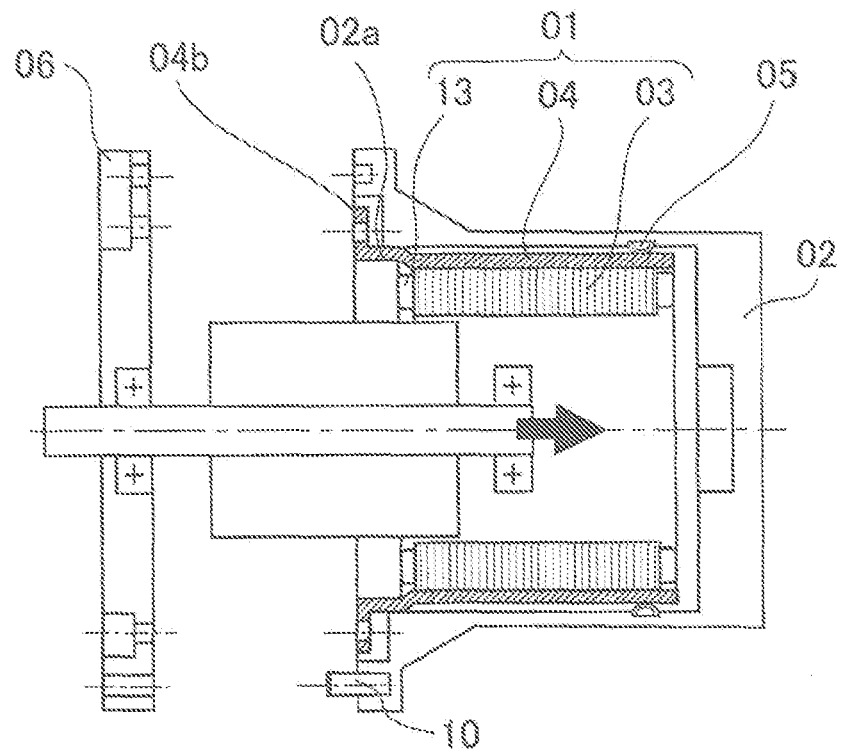
FIGS. 8A and 8B are explanatory views illustrating a mechanism and an assembly process of the rotary electric machine according to Embodiment 5 of the present invention.
Figure 8B:
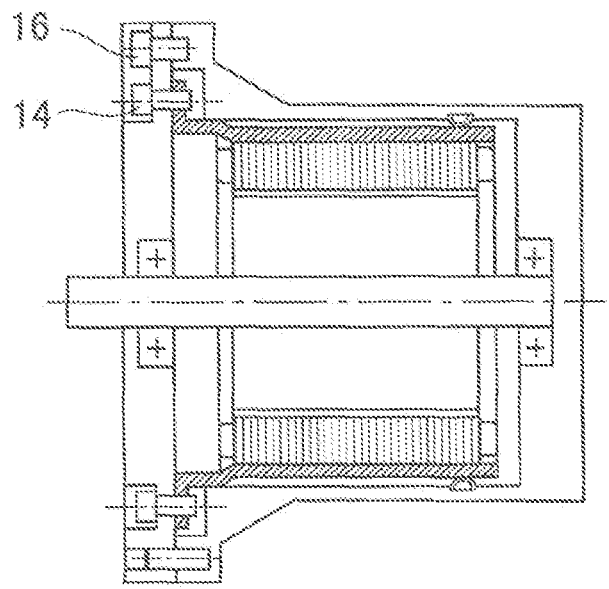

Hereinafter, a rotary electric machine according to Embodiment 5 of the present invention will be explained. FIG. 8 are explanatory views illustrating a mechanism and an assembly process of the rotary electric machine according to Embodiment 5 of the present invention, and FIG. 8A illustrates an assembling state of the rotary electric machine, and then, FIG. 8B illustrates the rotary electric machine after it is assembled. In FIG. 8, a flange 04b of a ring component 04 is fixed by bolts 14 on a wall surface of a second housing 06. The other components are similar to components in the rotary electric machine according to Embodiment 3.

As illustrated in FIG. 8, two positioning pins 10 (only one pin is illustrated in FIG. 8) is inserted two holes formed in a circumference direction of a first housing 02 and the second housing 06, and a position of the first housing 02 corresponds to a position of the second housing 06 in the circumference direction. Moreover, in order to prevent a shaft 08 from inclining, an axis of the shaft 08 corresponds to an axis of the first housing 02, and a stator 01 is inserted to inner space of the first housing 02, and the flange 04b of the ring component 04 is connected to the second housing 06 by the bolts 14 so as to be fixed, and moreover, the second housing 06 is connected to the first housing 02 by bolts 16 so as to be fixed. The bolts 14 and the bolts 16 are connected via the outside of the second housing 06.

In the rotary electric machine according to Embodiment 5 of the present invention, the stator 01 and the first housing 02 are fixed by press-fitting or burn-fitting a fitting outer surface 04c1 of the ring component 04 and a fitting inner surface 02a of the first housing 02, and the stator 01 and the first housing 02 are fixed by reactive force caused from the elastic component 05. Moreover, although the second housing 06 is fixed to the first housing 02, when the second housing 06 is fixed, the flange 04b of the ring component 04 is fixed to the second housing 06 by the bolts 14, and the first housing 02 and the second housing 06 are fixed by the bolts 16. The bolts 14 and bolts 16 can be tighten, at the same time, via the outside of the first housing 02, so that man-hours can be reduced. Moreover, it is not needed that screw holes for bolts, by which the flange 04b of the ring component 04 is fixed to the first housing 02, are formed.

Embodiment 6

Figure 9:
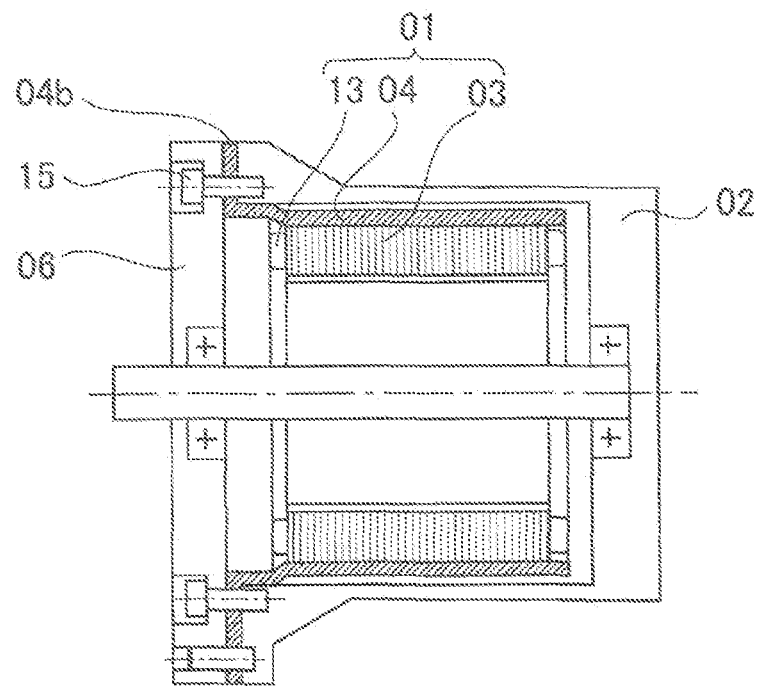
FIG. 9 is a cross-sectional view illustrating a rotary electric machine according to Embodiment 6 of the present invention.

Hereinafter, a rotary electric machine according to Embodiment 6 of the present invention will be explained. FIG. 9 is a cross-sectional view illustrating a rotary electric machine according to Embodiment 6 of the present invention. In FIG. 9, a flange 04b of a ring component 04 is arranged in such a way that the flange 04b is sandwiched between an end surface in an axis direction of a first housing 02 and an end surface of a second housing 06, and the second housing 06 is connected to the first housing 02 by bolts 15, whereby the components are integrally fixed to the housings. The other components are similar to components in the rotary electric machine according to Embodiment 2 or Embodiment 4.

In the rotary electric machine, which is configured as described above, according to Embodiment 6 of the present invention, the bolts 11, which connect the flange 04b and the first housing 02 in Embodiment 2, is not needed, so that the rotary electric machine can be downsized, and a number of the components can be reduced. Moreover, the flange 04b is sandwiched by the first housing 02 and the second housing 06 so as to be fixed, a fixing area in this case is increased in comparison with a fixing area in the case where the flange 04b is fixed by the bolts as described in Embodiment 2, so that stiffness of the flange 04b is increased, and a vibration cased at the time of driving are not easily transferred to a stator 01, whereby a vibration of the stator 01 can be suppressed, and a noise caused at the time of driving can be suppressed.

Embodiment 7

Figure 10:
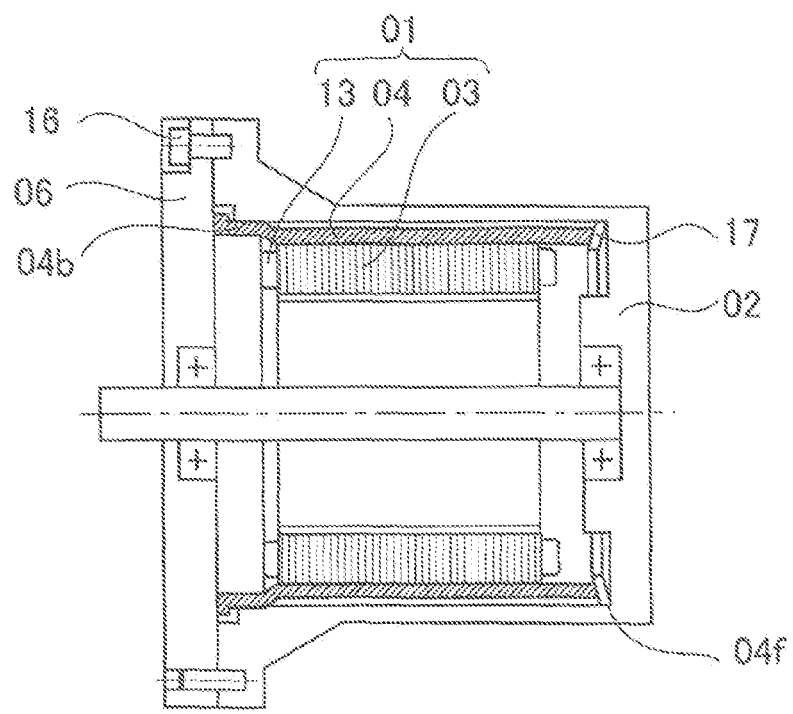
FIG. 10 is a cross-sectional view illustrating a rotary electric machine according to Embodiment 7 of the present invention.

Hereinafter, a rotary electric machine according to Embodiment 7 of the present invention will be explained. FIG. 10 is a cross-sectional view illustrating a rotary electric machine according to Embodiment 7 of the present invention. In FIG. 10, an end surface of a flange 04b of a ring component 04 is contacted to a second housing 06, and an end surface 04f at an opposite side of the flange is contacted to an inner wall surface of a bottom portion 21 of the first housing 02 via an elastic component 17. The first housing 02 and the second housing 06 are connected by bolts 16, whereby the ring component 04 is pressed and fixed in an axis direction while the elastic component 04 is opposing to elastic force of the elastic component 17. In addition, the ring component 04 may be directly connected to the inner wall surface of the bottom portion 21 without providing the elastic component 17.

In the rotary electric machine, which is configured as described above, according to Embodiment 7 of the present invention, the bolts 11, which connect the flange 04b and the first housing 02 in Embodiment 2, is not needed, so that the rotary electric machine can be downsized, and a number of the components can be reduced. Moreover, the ring component 04 is compressed in the axis direction so as to be fixed, and frictional force between an end surface of the flange 04b and one end surface in an axis direction of the first housing 02 as well as frictional force between the end surface 04f at an opposite side of the flange of the ring component 04 and the inner wall surface of the bottom portion 21 of the first housing 02 is increased by compress force opposing to the ring component 04 in an axis direction, so that a position in a diameter direction of a stator 01 facing to the first housing 02 is stabilized and fixed. Thereby, the stator 01 is fixed in the axis direction and the diameter direction, so that a vibration at the time of driving the rotary electric machine is not easily transferred, and a vibration of the stator 01 can be suppressed, and a noise at the time of driving the rotary electric machine can be suppressed.

When a linear expansion coefficient of the first housing 02 is different from a linear expansion coefficient of a ring component 04, a case is assumed in which a contact portion for an end surface of the flange 04b of the ring component 04 and an end surface of the second housing 06 is separated by a temperature variation, or a contact portion for the end surface 04f at an opposite side of the flange of the ring component 04 and the inner wall surface of the bottom portion 21 of the first housing 02 is separated by a temperature variation. A usage temperature range in a rotary electric machine used for a car is wider than a usage temperature range in an industrial rotary electric machine, so that a countermeasure for the wide rang is required. However, in the rotary electric machine according to Embodiment 7 of the present invention, the elastic component 17 is disposed, so that, even when temperature is varied, the required compression force in the axis direction of the ring component 04 can be obtained by holding compression force of the elastic component 17.

In addition, in the scope of the present invention, it is possible that each of embodiments is freely combined, or each of embodiments is suitably modified or omitted.

What is claimed is:

1. A rotary electric machine comprising:
   a stator core that is formed in an annular shape;
   a rotor that is supported in a freely rotational state, and is inserted to inner space of the stator core;
   a first housing that houses the stator core and the rotor;
   a second housing that is provided so as to face toward one end portion in an axis direction of the first housing; and
   a ring component that is mounted on an outer surface of the stator core; wherein
   the ring component includes a cylinder surrounding the outer surface of the stator core, and a flange provided on one end portion in an axis direction of the cylinder;
   the cylinder of the ring component is formed in such a way that a fitting outer surface, which is provided at a side corresponding to the one end portion of the axis direction, is fitted to a fitting inner surface, which is provided at a side corresponding to one end portion of the axis direction of the first housing;
   a clearance value between the fitting outer surface of the cylinder and the fitting inner surface of the first housing is lower than a clearance value between an outer surface on an end of the cylinder of the ring component opposite the one end portion in the axis direction, in which the fitting outer surface is excepted, of the cylinder and an inner surface, in which the fitting inner surface is excepted, of the first housing; and
   a position in a diameter direction of the stator core facing to the first housing is set by fitting the fitting outer surface of the cylinder to the fitting inner surface of the first housing.

2. A rotary electric machine according to claim 1, wherein the fitting outer surface on the cylinder of the ring component is composed of an outer surface of an annular step formed on an outer surface of the cylinder.

3. A rotary electric machine according to claim 1, wherein an elastic component, which is provided between an outer surface corresponding to the other end portion in the axis direction of the cylinder and an inner surface corresponding to the other end portion in the axis direction of the first housing, is included.

4. A rotary electric machine according to claim 3, wherein the elastic component is disposed in a groove formed on an inner surface corresponding to the other end portion in the axis direction of the first housing.

5. A rotary electric machine according to claim 1, wherein the second housing includes a fitting protrusion formed on a wall surface facing to the first housing, and the fitting inner surface of the cylinder is fitted to an outer surface of the fitting protrusion of the second housing.

6. A rotary electric machine according to claim 1, wherein a thickness in a radial direction of a portion corresponding to the fitting inner surface of the first housing is larger than at least a thickness in a radial direction of a portion neighboring the other end portion in the axis direction of the first housing.

7. A rotary electric machine according to claim 1, wherein the flange provided on the cylinder of the ring component is fixed to the first housing or the second housing by a fixing component.

8. A rotary electric machine according to claim 1, wherein the flange provided on the cylinder of the ring component is sandwiched between the first housing and the second housing, and the first housing and the second housing are connected to each other by a connection component, whereby the flange is fixed to the first housing and the second housing.

9. A rotary electric machine according to claim 1, wherein the ring component is arranged in such a way that the flange is contacted to the second housing, and the other end portion in the axis direction of the cylinder is directly or indirectly contacted to an inner wall of a bottom portion of the first housing; and the first housing and the second housing are connected to each other by a connection component, whereby the ring component is compressed in the axis direction so as to be fixed to the first housing and the second housing.

10. A rotary electric machine according to claim 9, wherein an elastic component, which is disposed between the other end portion in the axis direction of the cylinder and the inner wall of the first housing, is included.

11. A rotary electric machine according to claim 1, wherein the rotor is fixed to a shaft that is supported by the first housing and the second housing in a freely rotational state.

12. A rotary electric machine according to claim 1, wherein the clearance value extends from a portion of the fitting outer surface of the cylinder to the end of the cylinder.

* * * * *